United States Patent [19]

Rossmann

[11] Patent Number: 4,468,846
[45] Date of Patent: Sep. 4, 1984

[54] PROJECTILE CONTAINING A FLARE COMPOSITION SLEEVE AND METHOD FOR SECURING THE FLARE COMPOSITION SLEEVE IN A BORE AT THE TAIL OF A PROJECTILE BODY

[75] Inventor: Rudolf Rossmann, Zurich, Switzerland

[73] Assignee: Werkzeugmaschinenfabrik Oerlikon-Bührle AG, Zurich, Switzerland

[21] Appl. No.: 400,662

[22] Filed: Jul. 22, 1982

[30] Foreign Application Priority Data

Aug. 5, 1981 [CH] Switzerland .......................... 5042/81

[51] Int. Cl.³ ...................... B21K 21/06; B23P 17/00
[52] U.S. Cl. ................................... 29/1.23; 29/421 R
[58] Field of Search ................ 29/421 R, 1.23, 522 R, 29/523, 507, 512, 506

[56] References Cited

U.S. PATENT DOCUMENTS

| | | |
|---|---|---|
| 2,423,862 | 7/1947 | Vorobik . |
| 2,956,471 | 10/1960 | McManus . |
| 4,052,872 | 10/1977 | Herr ................................... 29/421 R |
| 4,109,365 | 8/1978 | Tyart ................................. 29/421 R |
| 4,132,437 | 1/1979 | Green . |
| 4,320,568 | 3/1982 | Herrod et al. ..................... 29/421 R |
| 4,388,752 | 6/1983 | Vinciguerra et al. ............. 29/421 R |

FOREIGN PATENT DOCUMENTS

| | | |
|---|---|---|
| 707002 | 6/1941 | Fed. Rep. of Germany . |
| 799407 | 4/1936 | France . |
| 1485671 | 5/1967 | France . |
| 2255573 | 7/1975 | France . |
| 2364427 | 8/1977 | France . |
| 2398283 | 7/1978 | France . |

Primary Examiner—Howard N. Goldberg
Assistant Examiner—Steven E. Nichols
Attorney, Agent, or Firm—Werner W. Kleeman

[57] ABSTRACT

For the attachment of a flare composition sleeve in a bore at the tail of a projectile body it was heretofore necessary to maintain very exact fabrication tolerances in order to provide a reliable sealing action against the propellant gases. To avoid this drawback the invention contemplates, in a first method step, pressing the flare composition sleeve, with the aid of a pressing plug or pin, into the bore at the tail or rear portion of the projectile body and, during a second method step, a ring-shaped edge of the flare composition sleeve is enlarged by means of an elastically deformable, such as a plastic or rubber plug until the ring-shaped edge bears against a ring-shaped groove of the bore wall of the projectile body. The flare composition sleeve possesses at the aforementioned end confronting the projectile body a smaller or at most the same wall thickness as at the remaining region.

4 Claims, 5 Drawing Figures

PROJECTILE CONTAINING A FLARE COMPOSITION SLEEVE AND METHOD FOR SECURING THE FLARE COMPOSITION SLEEVE IN A BORE AT THE TAIL OF A PROJECTILE BODY

BACKGROUND OF THE INVENTION

The present invention relates to a new and improved construction of a projectile containing a flare composition sleeve and, furthermore, pertains to an improved method for the attachment of the flare composition sleeve in a bore at the tail or rear portion of a projectile body.

In its more specific aspects the invention concerns a projectile containing a projectile body and a flare composition sleeve which is secured in a bore at the tail of the projectile body, wherein the bore wall possesses a subtantially ring-shaped groove, and the flare composition sleeve protrudes into the ring-shaped groove of the bore wall at its end confronting the projectile body.

Additionally, as already indicated the invention also relates to a method of attaching a flare composition sleeve into a bore at the tail or rear portion of a projectile body, wherein there is produced at the wall of the bore a substantially ring-shaped groove into which there is pressed an edge or rim of the flare composition sleeve.

According to a heretofore known projectile of this type, as disclosed for instance in U.S. Pat. No. 4,249,466, granted Feb. 10, 1981 and the cognate Swiss Pat. No. 622,883, granted Apr. 30, 1981, the flare composition sleeve is provided at its end confronting the projectile body with a flange which protrudes into the ring-shaped groove.

According to a known method of the type previously discussed, and again as known from the aforementioned U.S. Pat. No. 4,249,466 and the cognate Swiss Pat. No. 622,883, a ring-shaped groove is cut into the bore of the projectile body at the front end. The flare composition sleeve is provided at its front end with an inwardly directed flange edge. In order to attach the flare composition sleeve the flange edge is pressed, by plastic deformation, into the ring-shaped groove of the bore of the projectile body, whereby the bore is protected against the penetration of propellant gases and the flare composition sleeve is anchored in the projectile body.

This state-of-the-art construction of projectile and method of fabricating the same is afflicted with the drawback that both during the manufacture of the bore at the tail or rear portion of the projectile and also during the manufacture of the flare composition sleeve, especially the inwardly directed flange or flange edge, it is absolutely necessary to maintain exact manufacturing tolerances.

SUMMARY OF THE INVENTION

Therefore, with the foregoing in mind it is a primary object of the present invention to provide a new and improved construction of a projectile having a flare composition sleeve and a method for securing the flare composition sleeve in a bore at the tail or rear portion of a projectile body, in a manner not afflicted with the aforementioned drawbacks and limitations of the prior art.

Another and more specific object of the present invention is directed to a new and improved method of the character described which reduces the requirements which are placed upon the fabrication tolerances while nonetheless ensuring for a reliable and gastight anchoring of the flare composition sleeve in the bore at the tail or rear portion of a projectile body.

Yet a further significant object of the present invention is directed to an improved method for reliably securing a flare composition sleeve in a bore at the tail of a projectile body in an extremely efficient and economical manner.

Still a further important object of the present invention is concerned with a novel construction of projectile containing a flare or luminescent composition sleeve, and wherein the manufacture thereof can be performed with increased economies.

Now in order to implement these and still further objects of the invention, which will become more readily apparent as the description proceeds, the projectile of the present development is manifested by the features that the flare composition sleeve possesses at the aforementioned end confronting the projectile body a smaller or, at most, equal wall thickness than at the remaining portion or region thereof.

As already alluded to above the invention is not only concerned with a novel construction of projectile containing a flare composition sleeve, but also pertains to a novel method of fabricating the same. According to the invention the method aspects of the present development are manifested by the features that:

(a) during a first method step the flare composition sleeve is pressed with the aid of a pressing-in plug or pin into the bore; and (b) during a second method step there is widened or expanded the ring-shaped edge or rim of the flare composition sleeve with the aid of an elastically deformable, such as a plastic or rubber plug and a plugging or ramming insert, until the ring-shaped edge bears against the ring-shaped groove.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figures 1, 5:
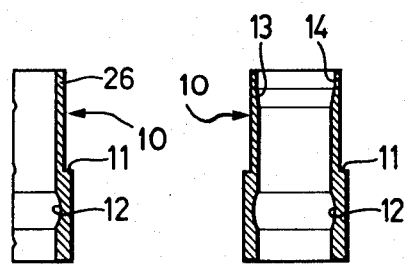
FIG. 1 illustrates a flare composition sleeve prior to its attachment in the projectile body.
FIG. 5 illustrates a second exemplary embodiment of flare composition sleeve which can be attached according to the invention at the projectile.

Turning attention now to the drawngs, there will be explained in conjunction therewith the method of the invention for the attachment of a flare composition sleeve in a bore at the tail or rear portion of a projectile body. In FIG. 1 there will be recognized that a flare composition sleeve or sleeve member 10 is provided with a substantially ring-shaped shoulder 11 at its outer surface. Additionally, the flare composition sleeve 10 possesses internally thereof, beneath the substantially annular or ring-shaped shoulder 11, a substantially ring-shaped or annular groove 12 and at its upper end possesses a subtantially conical widened or enlarged portion 13 and a relatively thin edge or marginal portion 14. There is preferably used for the flare composition sleeve 10 a material which can be easily deformed without fissures or cracks being formed during the widening or enlargement thereof.

Figure 2:
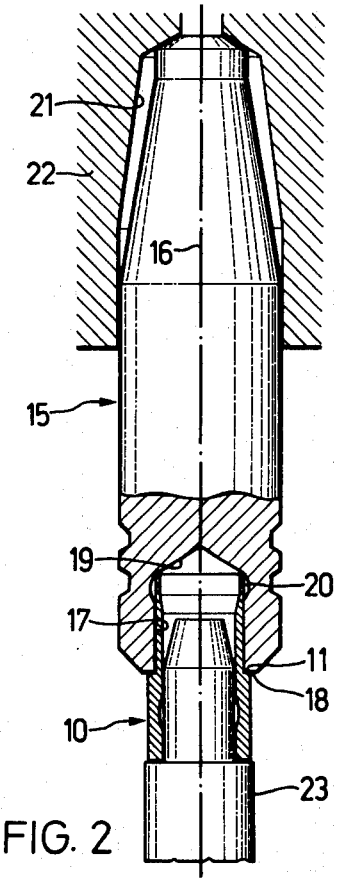
FIG. 2 illustrates the flare composition sleeve of FIG. 1 which here has been shown partially secured in the projectile body with the aid of a pressing-in plug or pin member.

As best seen by referring to FIG. 2, a projectile body 15 is provided at its rear end or tail with a blindhole bore 17 which is arranged essentially coaxially with respect to the lengthwise axis 16 of the projectile body 15. Protruding into the bore 17 up to the shoulder 11 is the flare composition sleeve or sleeve member 10, i.e. the shoulder 11 of the flare composition sleeve 10 bears upon an end surface 18 at the tail or rear end of the projectile body 15. The base or floor 19 of the bore 17 is constructed to possess a substantially cone-shaped configuration. Beneath this substantially conical-shaped base or floor 19 there is provided a substantially ring-shaped or annular groove 20 which serves for the attachment of the flare composition sleeve 10, as will be explained in greater detail hereinafter. In all other respects the projectile body 15 illustrated in the drawing does not differ from conventional projectile bodies. The construction of the projectile body 15 therefore need not here be further described since additional details thereof are unimportant for understanding the underlying principles and concepts of the present invention.

In order to secure the flare composition sleeve 10 in the projectile body 15, during a first method step, the projectile body 15 is inserted into a bore 21 of a carrier or support body 22. Additionally, the flare composition sleeve 10 is mounted upon a pressing-in plug or pin member 23 or equivalent structure. With the aid of this pressing-in plug member 23 the flare composition sleeve 10 can be suitably pressed into the blindhole bore 17 of the projectile body 15.

By virtue of this first method step the flare composition sleeve 10 is already anchored in the projectile body 15 by virtue of the provided press fit.

Figure 3:
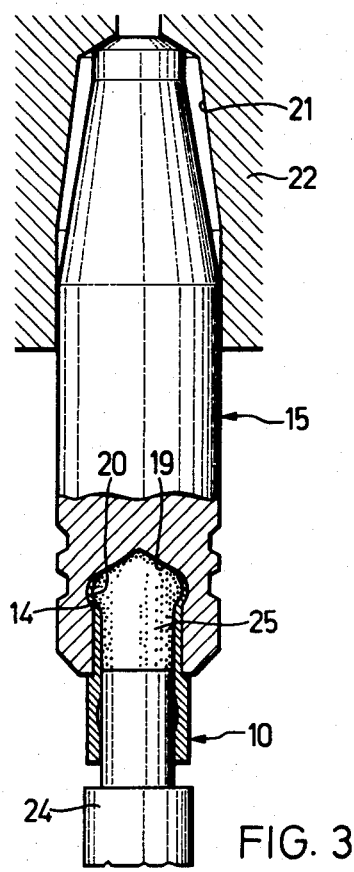
FIG. 3 illustrates the flare composition sleeve after it has been completely secured in the projectile body with the aid of a plastic plug or pin member.
Figure 4:
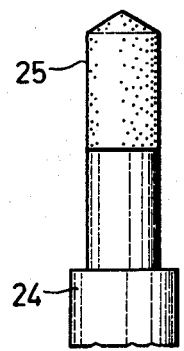
FIG. 4 illustrates a plugging or ramming insert or tool along with the elastic, such as plastic plug or rubber in the non-deformed condition thereof.

An additional anchoring of the flare composition sleeve 10 in the bore 17 of the projectile body 15 is achieved by a second method step which now will be described in detail:

The pressing-in plug member 23 is retracted out of the flare composition sleeve 10 and, in lieu thereof, there is inserted into the flare composition sleeve 10 a suitable tool, such as a plugging or ramming insert 24 containing a preferably elastically deformable solid plastic or elastomeric plug member 25, as shown in FIG. 4. The insertion of such plugging or ramming insert 24 and the preferably elastically deformable plastic or rubber plug member 25 into the flare composition sleeve 10 has been particularly well shown in FIG. 3. The plastic plug member 25 is pressed against the substantially cone-shaped floor or base 19, and it is thus radially outwardly widened, and hence, the thin upper edge or marginal portion 14 of the flare composition sleeve 10 is pressed into the ring-shaped groove 20 of the blindhole bore 17. This thin upper edge 14 is thus plastically deformed and retains its shape illustrated in FIG. 3 also after the removal of the plastic or rubber plug member 25.

The advantage of this method resides in the fact that, there can reliably obtained a form-locking or positive and gastight connection between the projectile body 15 and the flare composition sleeve 10.

Both the bore 17 and the projectile body 15 and also the flare composition sleeve 10 can be fabricated with large tolerances, since tolerance errors can be compensated due to the plastic deformation of the edge or marginal portion 14.

The described method is particularly suitable for armor-piercing projectile bodies or projectile cores which are fabricated of a hard, difficult to deform material.

In the modified construction of flare composition sleeve 10 depicted in FIG. 5, it will be seen that such flare composition sleeve 10 can be provided with a thicker edge 26 instead of the thin edge or marginal portion 14, and both the outer wall and also the inner wall of the flare composition sleeve 10 are here of essentially cylindrical configuration.

In both the construction of flare composition sleeve 10 of FIGS. 1 and 5 there is not used a flange ring or the like at the region of the edge or marginal portion located at the front of such sleeve. As such, the construction of the flare composition sleeve 10 is quite simple and economically feasible to fabricate and its attachement at the projectile likewise can be effectively accomplished with the teachings of the invention.

While there are shown and described present preferred embodiments of the invention, it is to be distinctly understood that the invention is not limited thereto, but may be otherwise variously embodied and practiced within the scope of the following claims. Accordingly,

What I claim is:

1. A method for securing a flare composition sleeve, which comprises an end member with a substantially ring-shaped edge portion, in a bore provided at the tail of a projectile body, said bore defining a bore wall in which a substantially ring-shaped groove is formed said method comprising the steps of:

during a first method step pressing the flare composition sleeve into the bore with the aid of a pressing-in plug member such that said end member with said substantially ring-shaped edge portion thereof is located adjacent said substantially ring-shaped groove in said bore wall; and during a second method step widening said substantially ring-shaped edge portion of the end member of said flare composition sleeve with the aid of an elastically deformable plug member and a plugging insert until the substantially ring-shaped edge portion bears against the substantially ring-shaped groove so as to form a gas-tight interconnection between said flare composition sleeve and said projectile body.

2. A method for securing a flare composition sleeve, which comprises an end member with a substantially ring-shaped edge portion, in a bore provided at the tail of a projectile body, said bore defining a bore wall in which a substantially ring-shaped groove is formed, said method comprising the steps of:

during a first method step reducing the wall thickness of said end member as compared to the wall thickness of the remaining flare composition sleeve;

during a second method step pressing the flare composition sleeve into the bore with the aid of a pressing-in plug member such that said substantially ring-shaped edge portion of said end member is located adjacent said substantially ring-shaped groove in said bore wall; and during a third method step widening said substantially ring-shaped edge portion of the end member of said flare composition sleeve with the aid of an elastically deformable plug member and a plugging insert until the substantially ring-shaped edge portion bears against the substantially ring-shaped groove so as to form a gas-tight interconnection between said flare composition sleeve and said projectile body.

3. The method as defined in claim 2, wherein:
said elastically deformable plug member is a plastic plug member.

4. The method as defined in claim 2, wherein:
said elastically deformable plug member is an elastomeric plug member.

* * * * *